(12) United States Patent
Han

(10) Patent No.: US 9,017,208 B2
(45) Date of Patent: Apr. 28, 2015

(54) INFINITELY VARIABLE MOTION CONTROL (IVMC) FOR GENERATORS, TRANSMISSIONS AND PUMPS/COMPRESSORS

(71) Applicant: Kyung Soo Han, Timonium, MD (US)

(72) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 0 days.

(21) Appl. No.: 14/096,171

(22) Filed: Dec. 4, 2013

(65) Prior Publication Data

US 2014/0094338 A1    Apr. 3, 2014

Related U.S. Application Data

(60) Division of application No. 13/425,501, filed on Mar. 21, 2012, now Pat. No. 8,641,570, which is a continuation-in-part of application No. 13/384,621, filed as application No. PCT/US2010/042519 on Jul. 20, 2010, now Pat. No. 8,388,481.

(60) Provisional application No. 61/466,056, filed on Mar. 22, 2011, provisional application No. 61/226,943, filed on Jul. 20, 2009.

(51) Int. Cl.
| F16H 37/08 | (2006.01) |
| F16H 3/72 | (2006.01) |
| F03D 11/00 | (2006.01) |
| F03D 11/02 | (2006.01) |
| H02P 9/04 | (2006.01) |
| H02P 9/42 | (2006.01) |
| F16H 29/04 | (2006.01) |

(52) U.S. Cl.
CPC ........ *F16H 3/72* (2013.01); *F03D 11/00* (2013.01); *F03D 11/02* (2013.01); *H02P 9/04* (2013.01); *H02P 9/42* (2013.01); *Y02E 10/722* (2013.01); *F16H 29/04* (2013.01)

(58) Field of Classification Search
USPC .................................................. 475/201, 206
See application file for complete search history.

(56) References Cited

U.S. PATENT DOCUMENTS

| 2,315,468 | A | | 4/1943 | Mulder | |
| 5,016,493 | A | * | 5/1991 | Han | ................................ 74/840 |
| 5,116,292 | A | * | 5/1992 | Han | ................................ 475/16 |

(Continued)

FOREIGN PATENT DOCUMENTS

JP    62080131    4/1987

OTHER PUBLICATIONS

International Preliminary Report of Patentability, PCT/US2010/042519, Feb. 2, 2012, five pages.

*Primary Examiner* — Tisha Lewis
(74) *Attorney, Agent, or Firm* — Cameron LLP

(57) ABSTRACT

Infinitely variable motion control (IVMC) provides motion control without any requirement for changing gears or use of a clutch. A bevel or spur gear transgear, defined as a system having an input, an output and a control, a variable pitch cam having an eccentric inner and outer cam assembly, a driver and a one-way clutch or ratchet bearing assembly may be used to form a cam controlled speed converter converting a given input to a variable or constant output speeds and further having direction control. All IVMC's, cam controlled IVMC, input compensated IVMC and pitch controlled IVMC may be utilized to form various embodiments of infinitely variable generators, transmissions and compressors/pumps.

21 Claims, 13 Drawing Sheets

(56) References Cited

U.S. PATENT DOCUMENTS

| | | | |
|---|---|---|---|
| 5,525,116 A * | 6/1996 | Ra et al. | 475/275 |
| 5,937,701 A | 8/1999 | Mimura | |
| 6,068,570 A * | 5/2000 | Han | 475/207 |
| 6,537,168 B1 * | 3/2003 | Han | 475/8 |
| 6,641,327 B1 | 11/2003 | Lassila et al. | |
| 7,462,124 B2 * | 12/2008 | Han | 475/270 |
| 7,731,616 B2 | 6/2010 | Han | |
| 7,731,619 B2 | 6/2010 | Han | |
| 2007/0082779 A1 | 4/2007 | Han | |
| 2009/0118043 A1 | 5/2009 | Eitan et al. | |
| 2009/0302611 A1 | 12/2009 | Masters et al. | |
| 2010/0181771 A1 | 7/2010 | Roos | |

\* cited by examiner

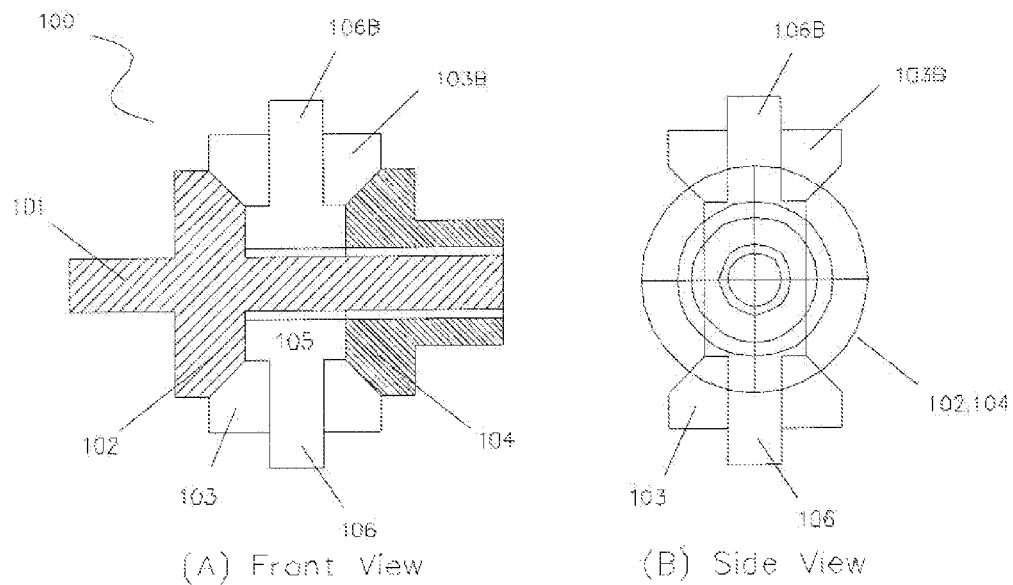
(A) Front View　　(B) Side View
Figure 1: Bevel Gear Transgear
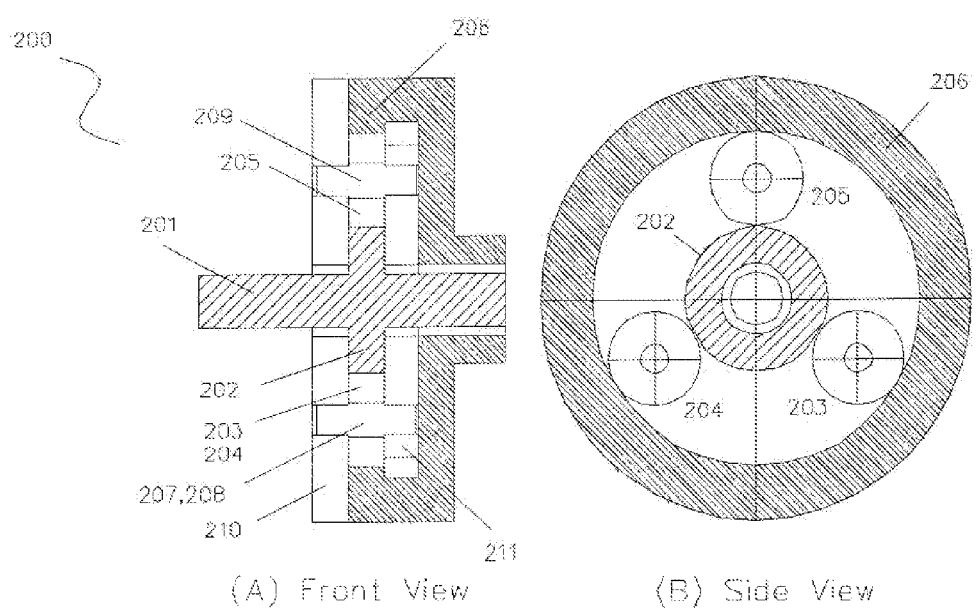
(A) Front View　　(B) Side View
Figure 2: Ring Gear Transgear

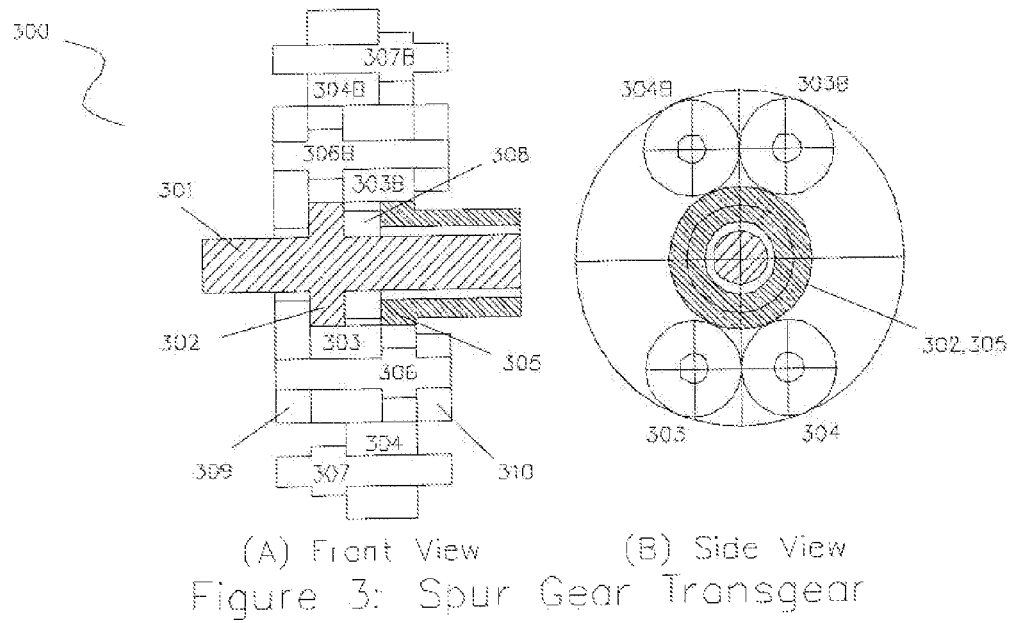
(A) Front View    (B) Side View
Figure 3: Spur Gear Transgear
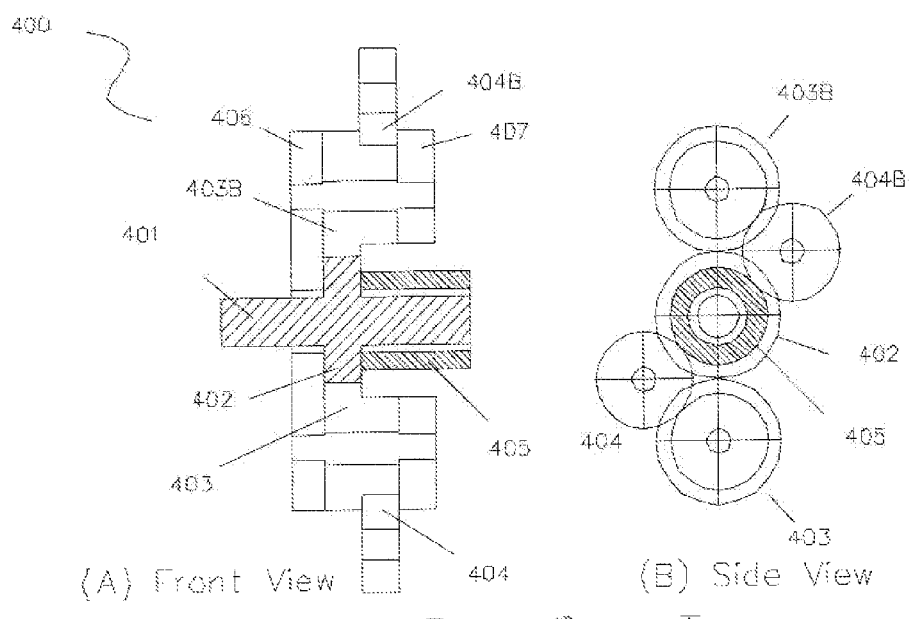
(A) Front View    (B) Side View
Figure 4: Spur Gear Transgear

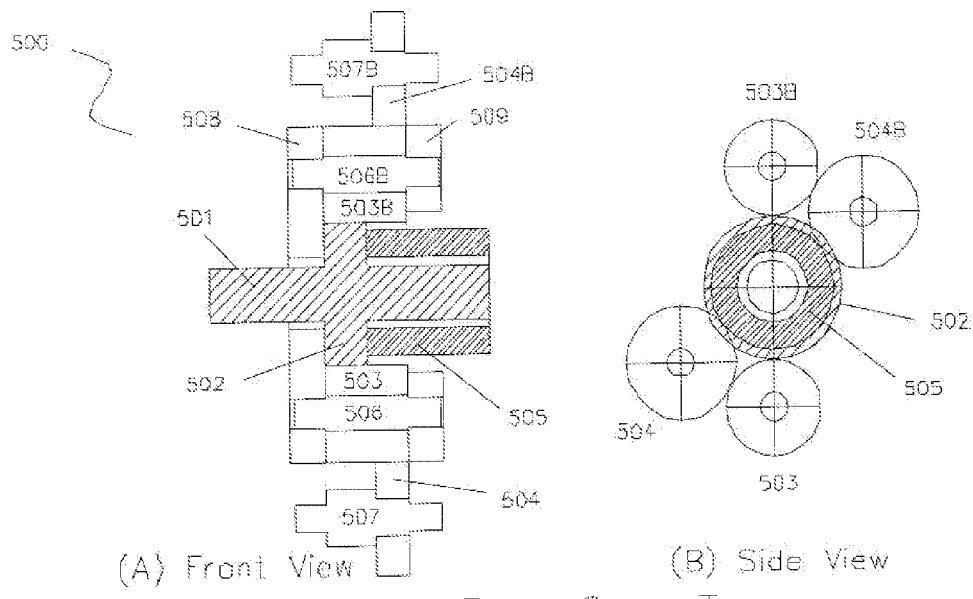
(A) Front View  (B) Side View
Figure 5: Spur Gear Transgear
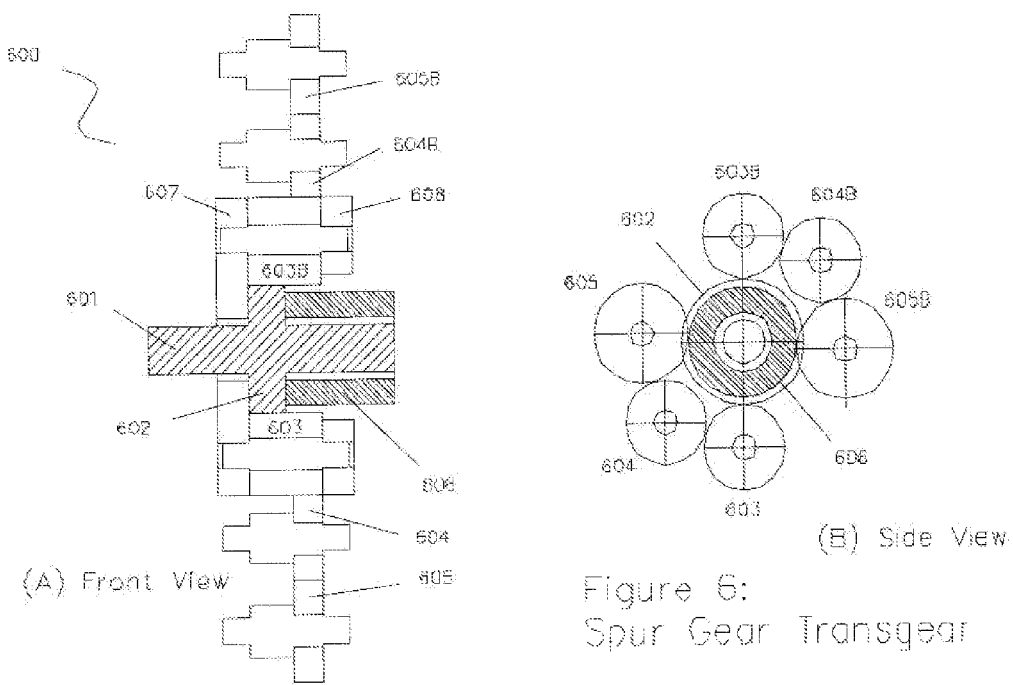
(A) Front View
Figure 6: Spur Gear Transgear
(B) Side View

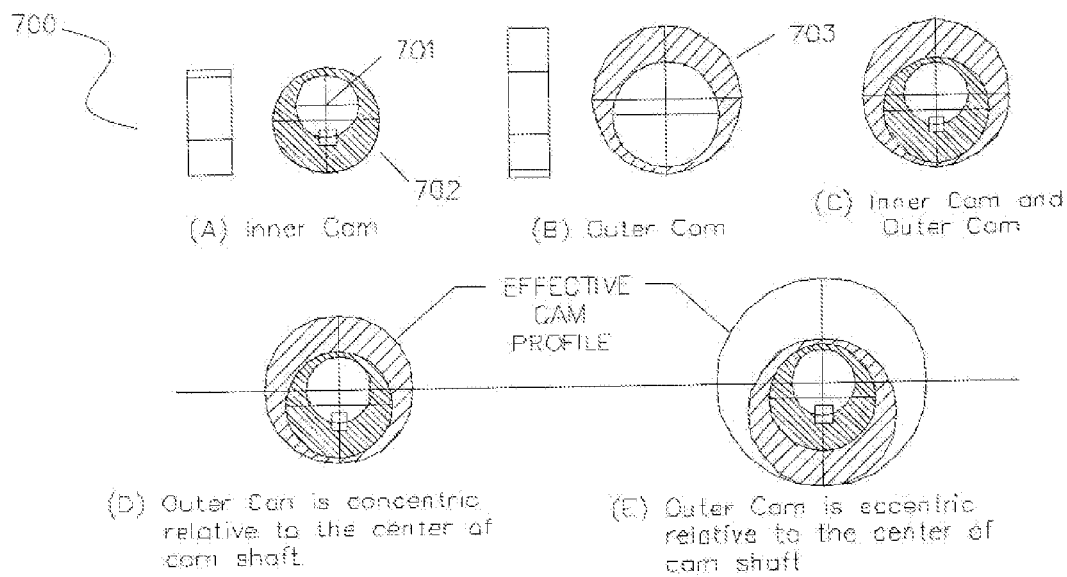
Figure 7: Variable Pitch Cams
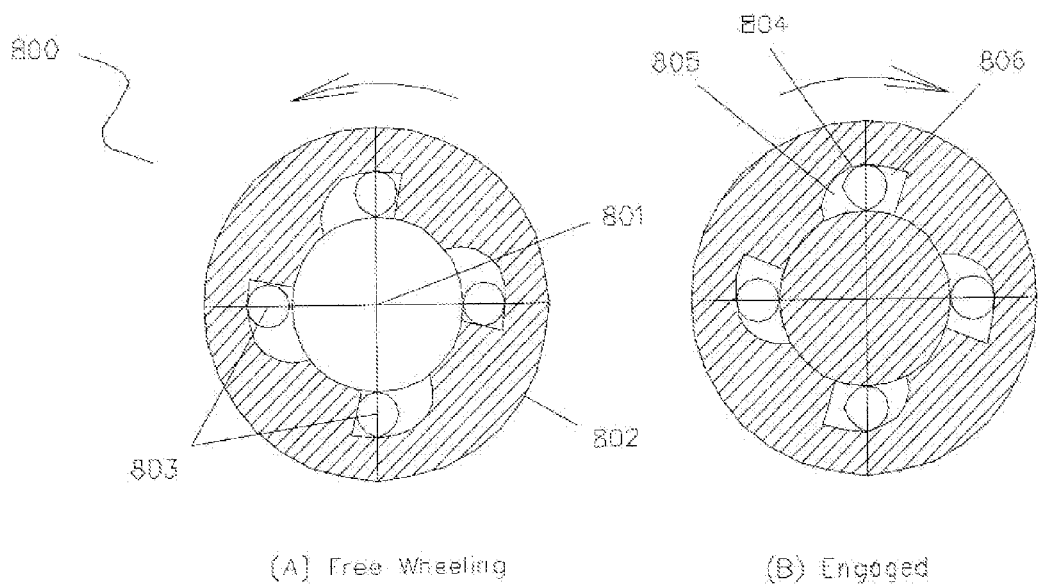
Figure 8: Oneway Clutch Bearing

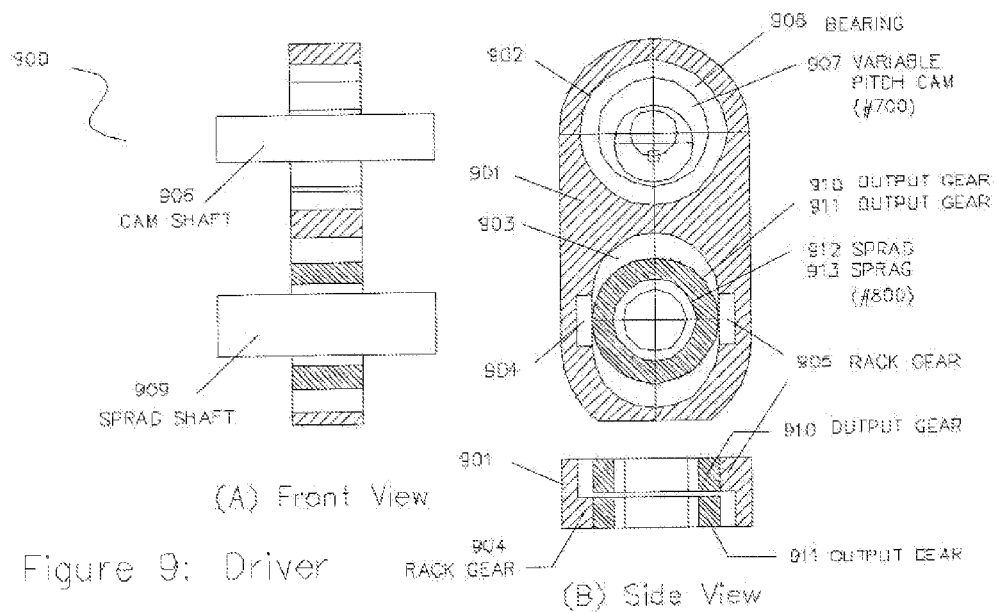
Figure 9: Driver
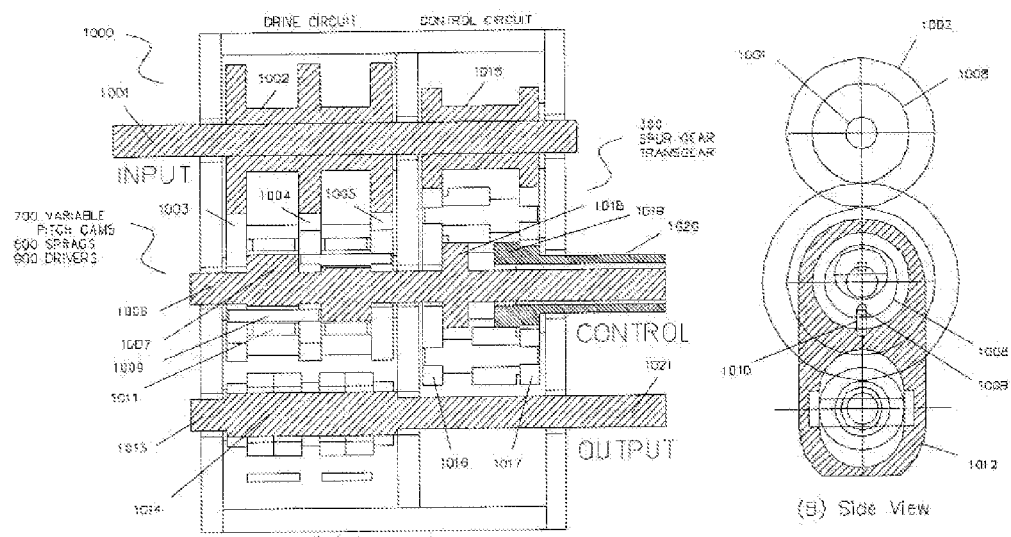
Figure 10: Cam Controlled Speed Converter

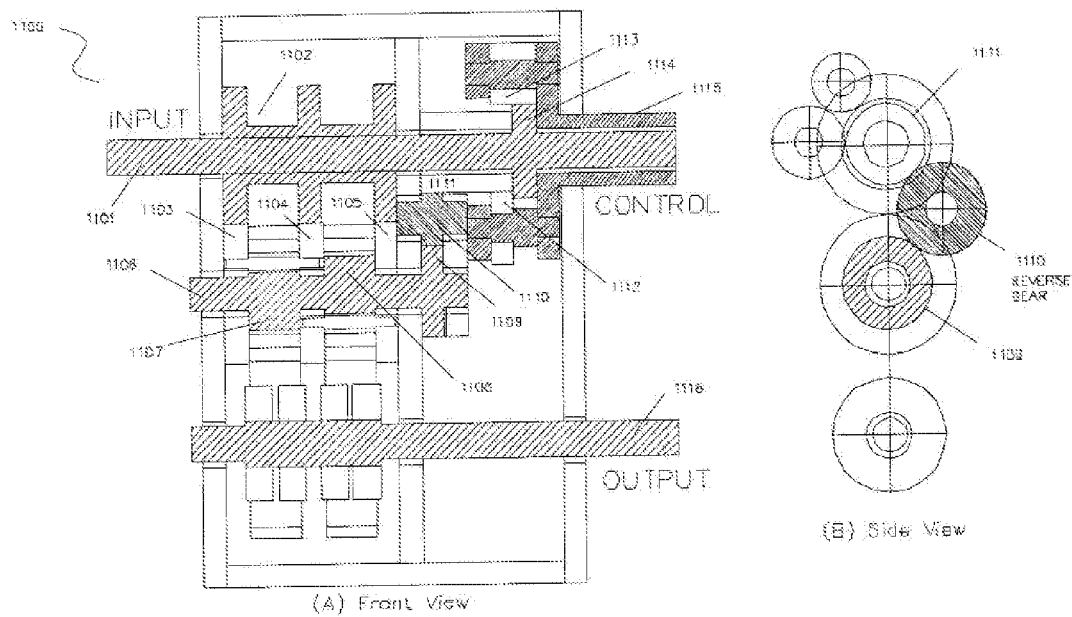
Figure 11: Cam Controlled Speed Converter
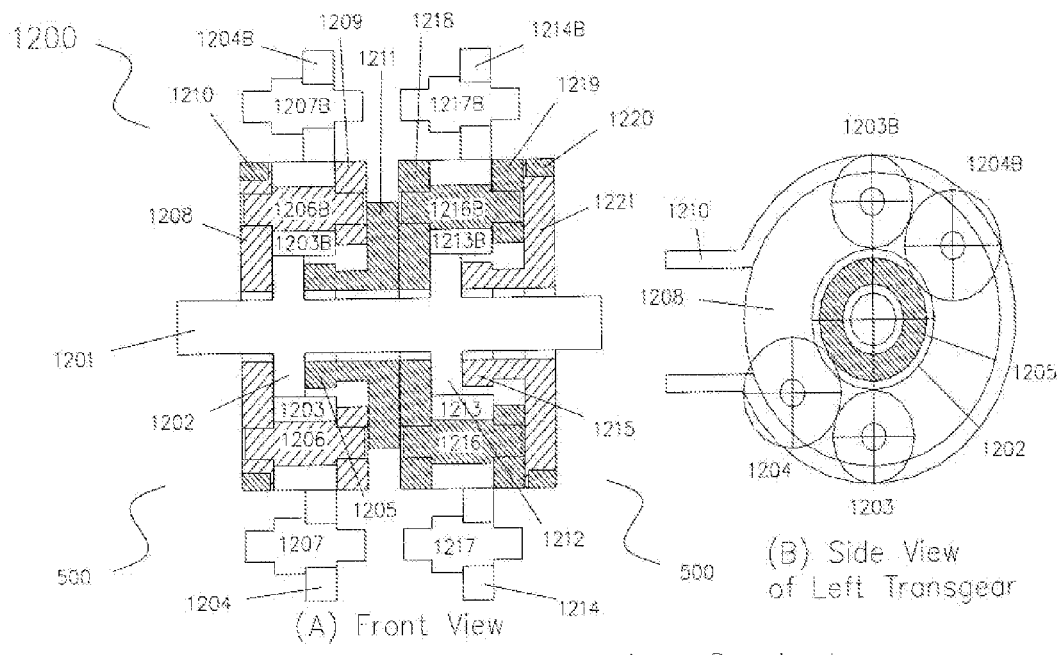
Figure 12: Direction Control

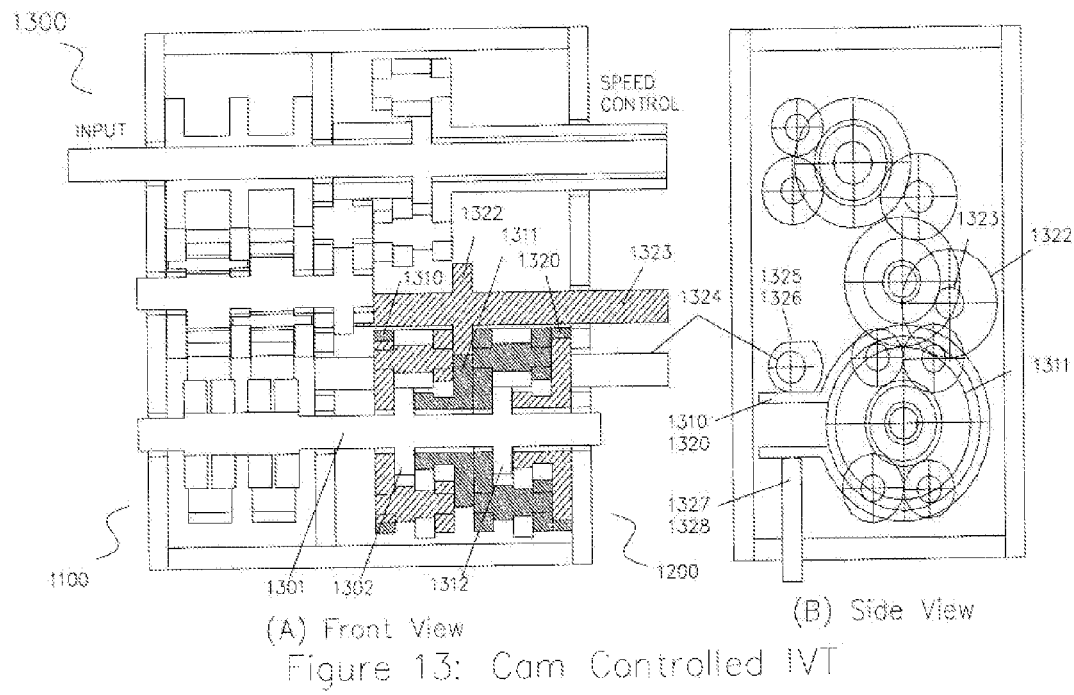
Figure 13: Cam Controlled IVT
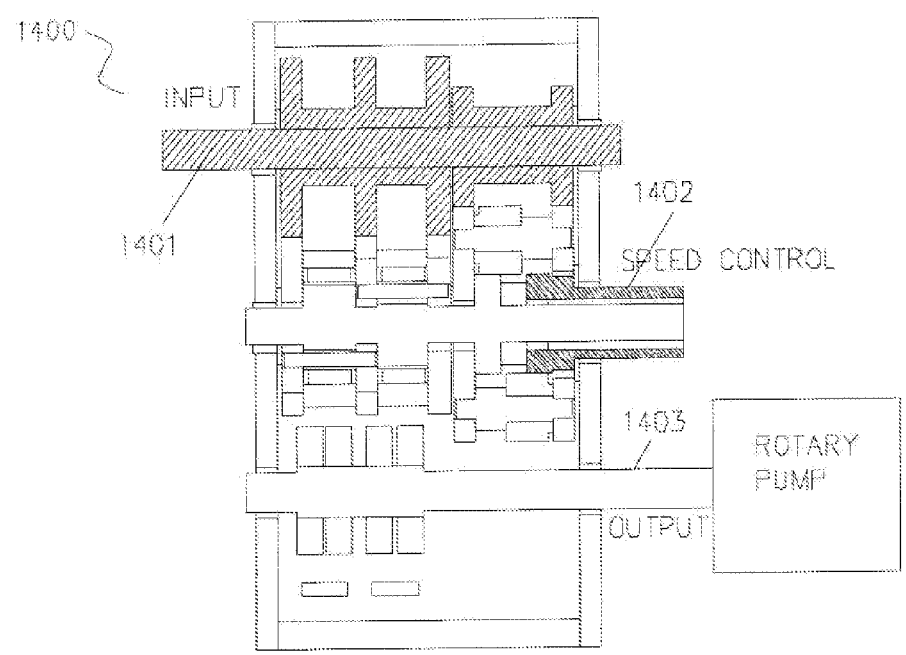
Figure 14: Cam Controlled Compressor

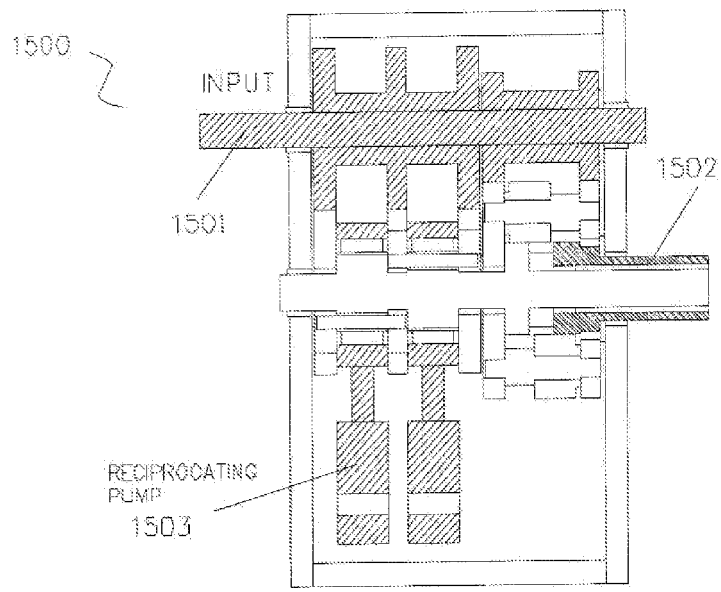
Figure 15: Cam Controlled Compressor
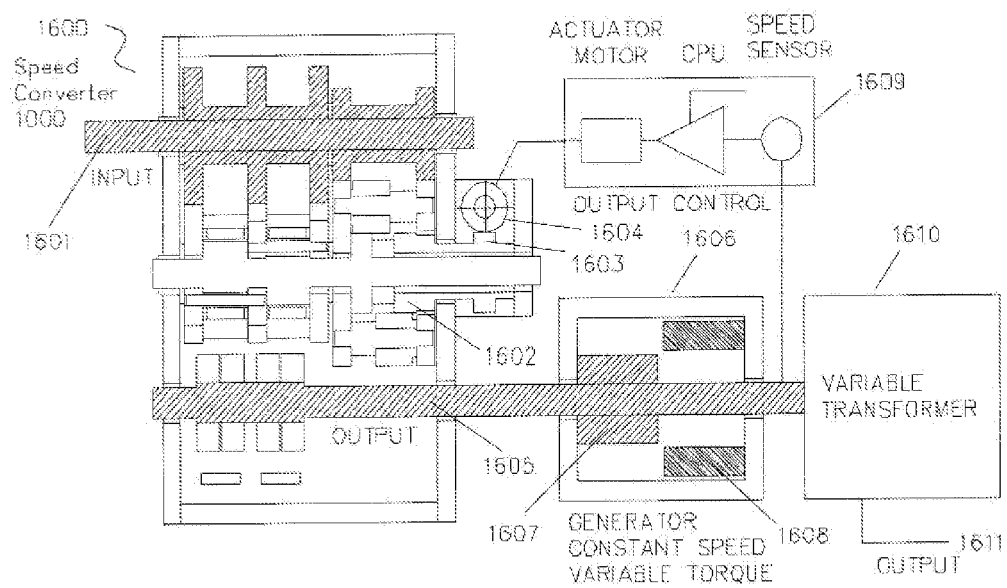
Figure 16: Cam Controlled Generator

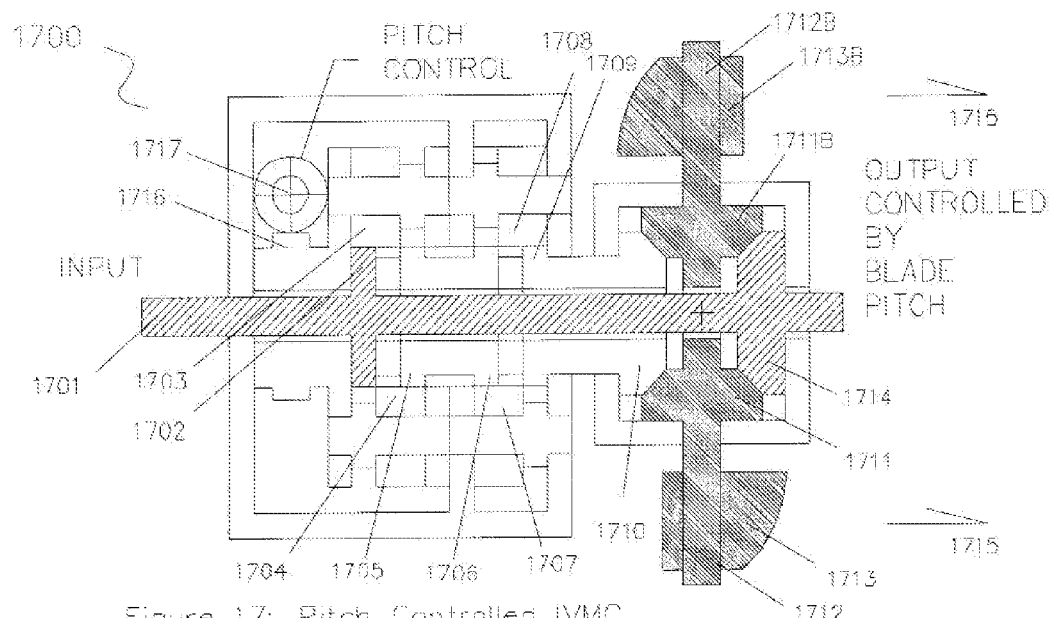
Figure 17: Pitch Controlled IVMC
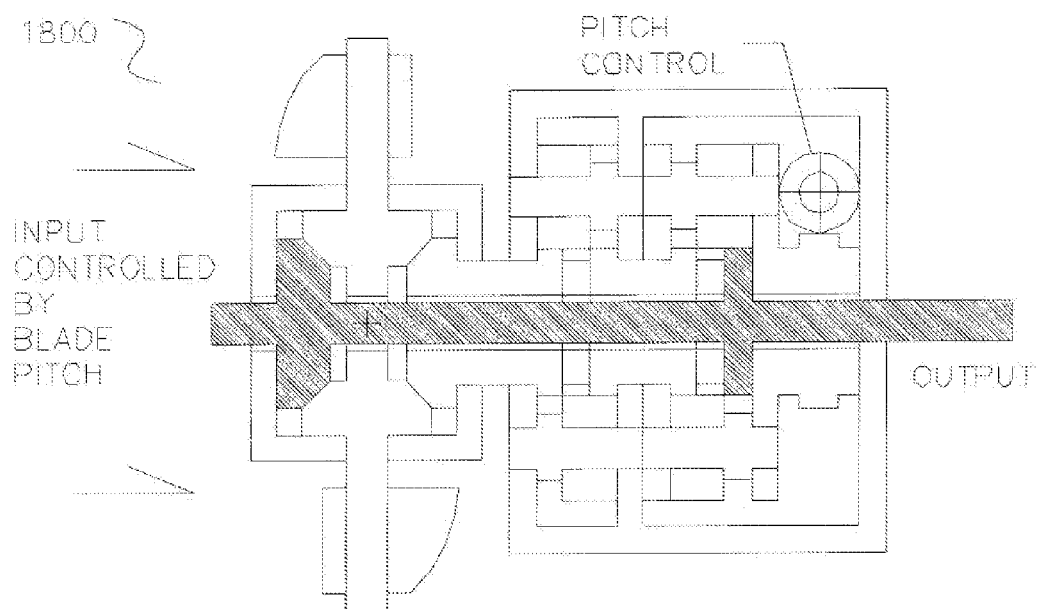
Figure 18: Pitch Controlled IVMC

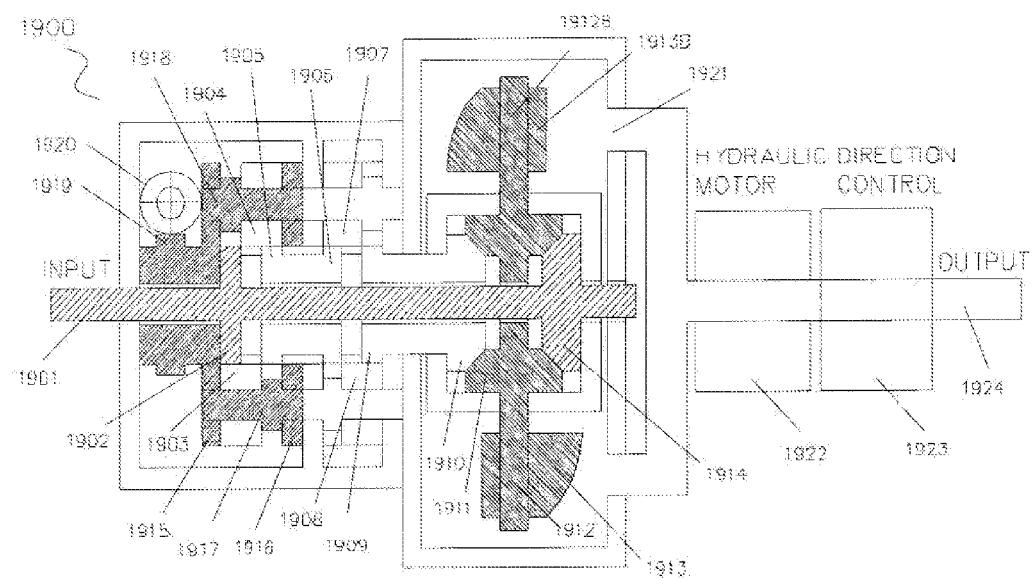
Figure 19: Pitch Controlled IVT
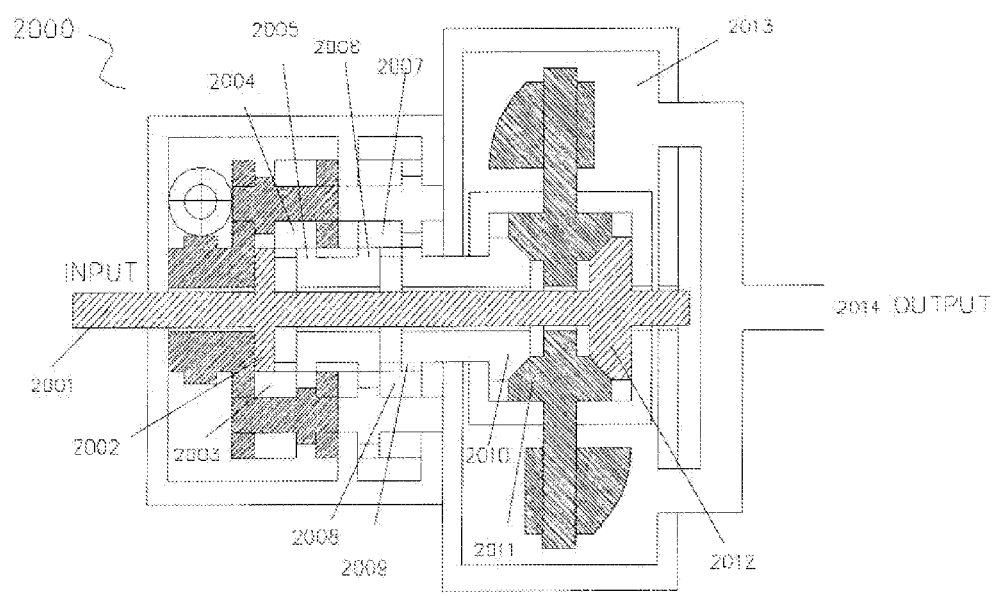
Figure 20: Pitch Controlled Compressor

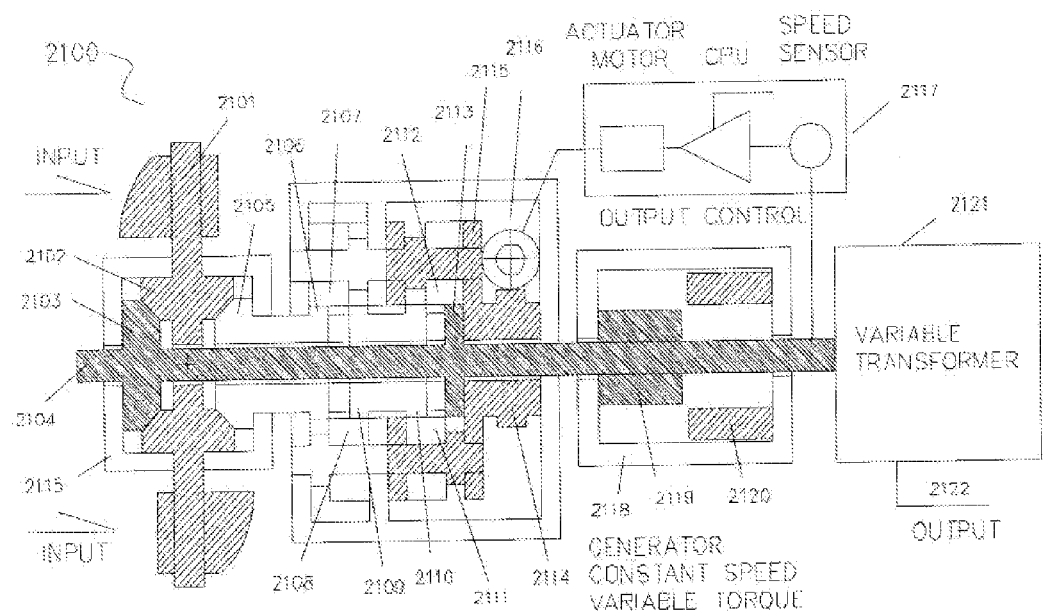
Figure 21: Pitch Controlled Generator
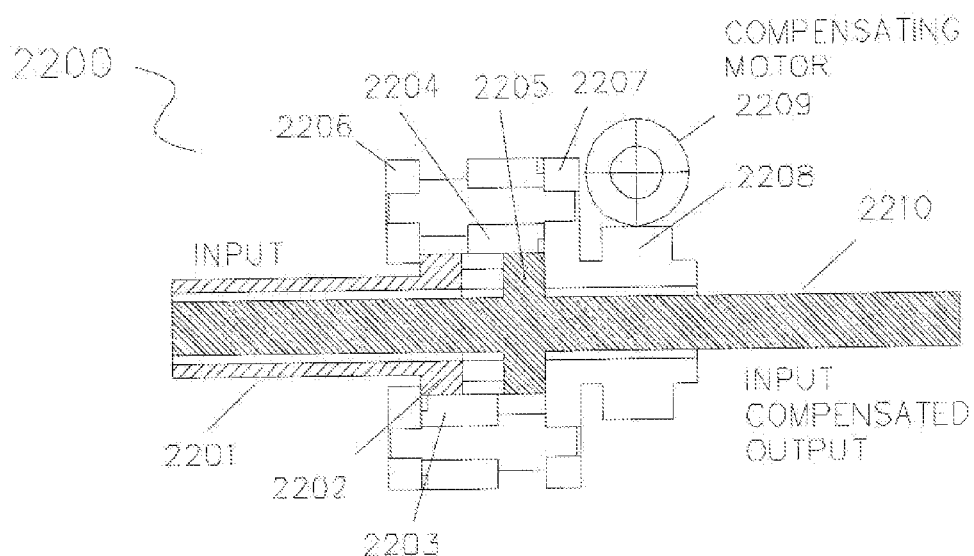
Figure 22: Input Compensated IVMC

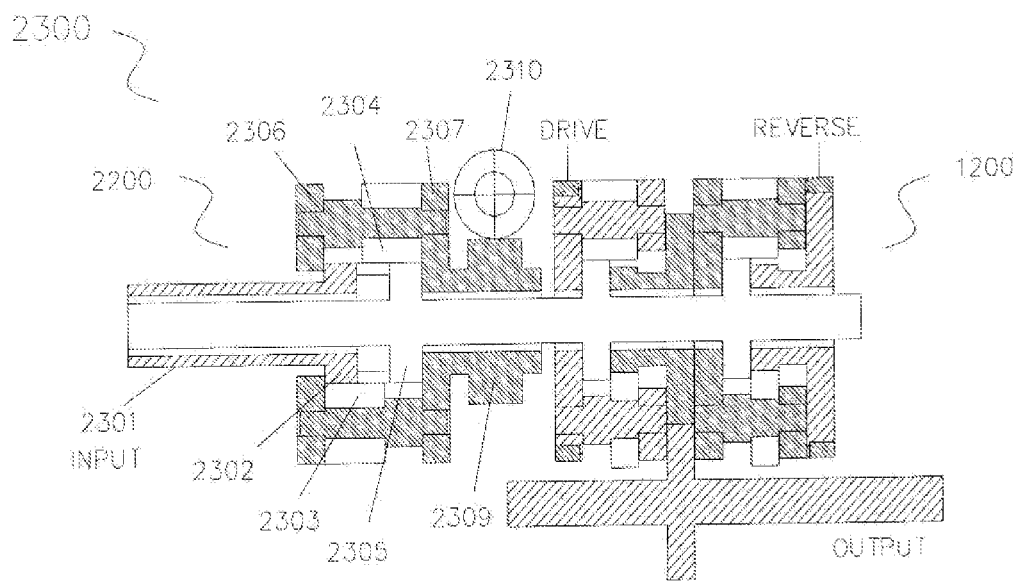
Figure 23: Input Compensated IVT
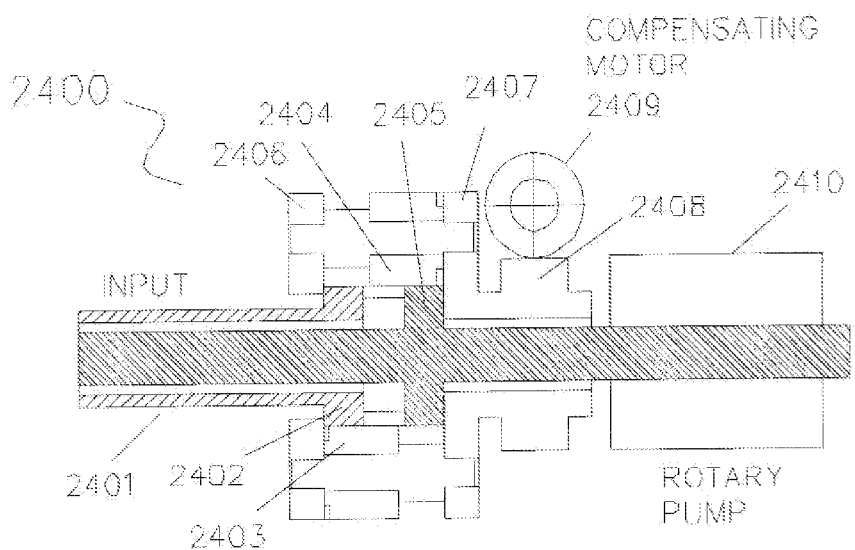
Figure 24: Input Compensated Compressor

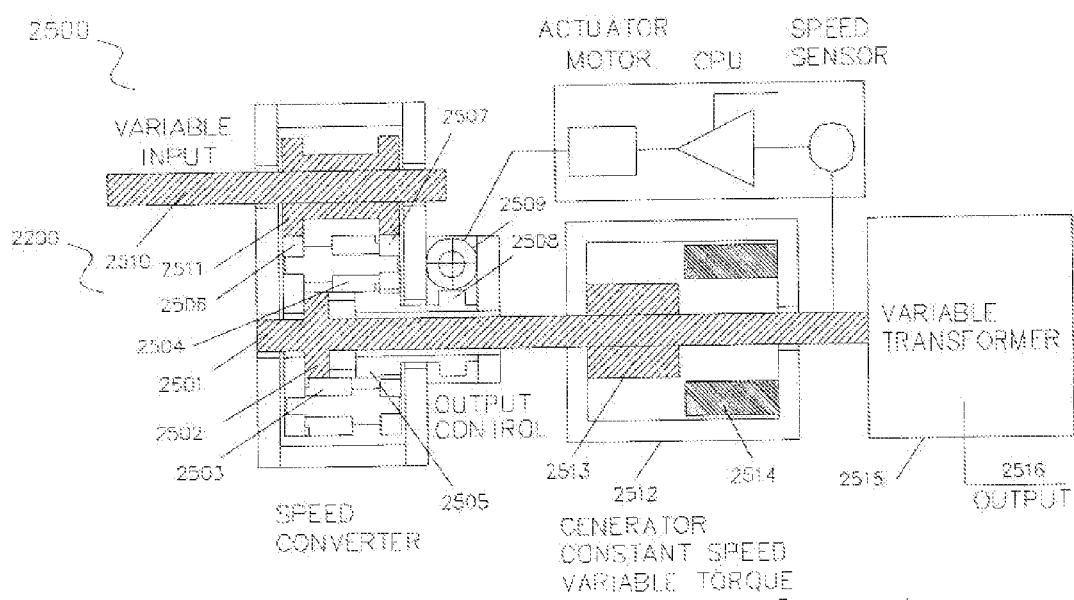
Figure 25: Input Compensated Generator

INFINITELY VARIABLE MOTION CONTROL (IVMC) FOR GENERATORS, TRANSMISSIONS AND PUMPS/COMPRESSORS This application is a divisional of U.S. patent application Ser. No. 13/425,501 filed Mar. 21, 2013 (now allowed) which claims the benefit of priority to U.S. Patent Application Ser. No. 61/466,056 filed Mar. 22, 2011, of Kyung Soo Han and is incorporated by reference as to its entire contents and U.S. patent application Ser. No. 13/425,501 is a continuation-in-part of U.S. patent application Ser. No. 13/384,621, filed Jan. 18, 2012, (now U.S. Pat. No. 8,388,481) being a national stage entry application of PCT US 10/42519 having an international filing date of Jul. 20, 2010 which claims the benefit of priority to U.S. provisional patent application 61/226,943, filed Jul. 20, 2009, all applications being incorporated by reference as to their entire contents.

TECHNICAL FIELD

The technical field of the invention relates to generators, transmissions, and pumps or compressors and, more particularly, to such devices with infinitely variable motion control.

BACKGROUND

It is generally known in the art to provide devices such as generators, transmissions, and pumps or compressors with variable speeds. In particular, transmissions are known with many speeds and gears whereby a shifting of gears and speeds typically involves the use of a clutch device so that a range of speed may be changed, for example, through a plurality of gears to reach a maximum number of revolutions per minute of an output shaft in each of the plurality of gears while an input shaft operates within the angular velocity range of, for example, a driving motor.

Applicant has been developing a concept referred to herein as infinitely variable motion control (IVMC) whereby an input, a control, and an output provide infinitely variable control without the need for any clutch.

Introduction to Infinitely Variable Motion Control (IVMC)

Differential Dynamics Corporation (DDMotion) has developed several different types of motion control technology to convert a given input to a controlled output. Each technology will be explained briefly first as part of the BACKGROUND. In the SUMMARY, the latest developments in infinitely variable motion controls will be described and, then, in the DETAILED DESCRIPTION of the drawings, the latest developments will be further described along with applications of the technology to some major products such as generators, transmissions for vehicles and other devices requiring transmissions and compressors or pumps will follow. Most of the concepts disclosed herein are based on the Kyung Soo Han's previous developmental work as exemplified by the patents and publications discussed briefly below.

U.S. Pat. No. 6,068,570 discuses speed control with planetary gears, speed control with spur gears, worm and worm gear control and compensated variable speed control. U.S. Pat. No. 6,537,168 discusses direction control with bevel gears and direction control with spur gears, U.S. Pat. No. 7,731,616 discusses a variable pitch cam. U.S. Pat. No. 7,462,124 discusses three variable control where the variable control comprises an input, an output, and a control. U.S. Pat. No. 7,731,619 discusses three variable control with bevel gears and three variable control with spur gears. WO2011011358A2 is a published international application of PCT U.S. 10/42519 filed Jul. 20, 2010 and claiming priority to U.S. provisional patent application 61/226,943 filed Jul. 20, 2009, which describes a speed converter with cam driven control and a variable torque generator producing a constant frequency and voltage output from a variable input. This PCT application has been filed in the United States as U.S. patent application Ser. No. 13/384,621, filed Jan. 18, 2012. Since priority is claimed to this '621 national stage entry patent application, its teachings are not to be considered prior art to the present IVMC apparatus. Applications of this speed converter/variable torque generator technology include and are not limited to applications in the field of clean energy generation such as wind and water driven electrical energy generators. All of the above-identified patents and published applications are incorporated by reference herein as to their entire contents.

SUMMARY OF THE SEVERAL EMBODIMENTS OF IVMC

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

Three variable mechanical controls may be used to convert variable input to constant output or constant input to variable output. Mechanical controls are efficient and scalable. All gear assemblies having three variables, input, output, and control, will be called "transgears" in this context.

A first control technology described herein may be referred to as cam driven infinitely variable motion control. A variable pitch cam assembly may comprise an eccentric inner cam that comprise a portion of a shaft, for example, an input shaft or an output shaft. The inner eccentric cam may be positioned and free to move within an eccentric outer cam. The control assembly thus comprises a shaft, the inner cam and an outer cam. The control assembly may be continuously controlled from a minimum eccentricity when the shaft is located central to the assembly to a period of maximum eccentricity when the shaft is located most proximate to the edge of the cam assembly. In this eccentric position, when the shaft rotates, the cam assembly forms an effective cam profile as depicted herein such that the profile is in the form of a circle having a much larger diameter than when the inner and outer cams are in a least eccentric position.

A further control technology as described herein may be referred to a ratchet bearing or a one-way clutch bearing. A Sprag is a trade name for such a bearing and is commercially available, for example, from Renold plc of the United Kingdom and from NMTG of India. Sprag may be used herein as a short-hand for such a bearing and assembly which is free-wheeling in one direction of rotation and engaged in the other rotation direction and may be referred to herein generally as output gears, for example, when discussing a driver and its application in a cam controlled speed converter.

An external housing of such a ratchet or one-way clutch bearing (or Sprag) has notches and, for example, needle rollers such that when an internal race is moving in one rotational direction, the outer housing may move in either direction and be free wheeling (or vice versa, if the outer housing rotates the inner race may move) because the needle roller is loose or free wheeling and located at one end of its associated notch. On the other hand, when the internal race rotates in the other rotational direction with respect to the outer housing or vice versa, the needle roller rolls into an engaged position between the race and the housing such that the housing is controlled to rotate in this other rotational direction with the race.

A further control technology is accomplished when the cam control assembly technology described above is used to drive. A sprag is embedded inside an output gear and the race of the ratchet bearing or one-way clutch is attached to the output shaft for rotation in one direction.

A blade has a pitch and may be used, for example, to capture wind energy or water energy. Its pitch may be controlled to further control the control technologies introduced above to achieve a pitch-controlled infinitely variable motion control.

Finally, input compensated infinitely variable motion control may comprise two independent inputs, a drive input and a control input, and an output for a three variable control motion control. A system of variable output may be achieved by releasing the drive input so that the output may be varied.

These several technologies will be further described with reference to particular applications in generators, transmissions and compressors or pumps and are depicted in the drawings, a brief description of which follows.

BRIEF DESCRIPTION OF THE DRAWINGS

The features and advantages of the present invention will become more apparent from the detailed description set forth below when taken in conjunction with the drawings in which like reference numbers may indicate identical or functionally similar elements.

FIGS. 1-6 provide variations of transgears as defined above having three variables, an input, an output and a control and are basic building blocks for infinitely variable motion control (IVMC).

FIG. 1 is an assembly of bevel gears and is being used as a bevel gear transgear wherein FIG. 1(A) provides a cross-sectional front view and FIG. 1(B) provides a side view.

FIG. 2 is an assembly of spur gears and a ring gear or internal gear, commonly called a planetary gear assembly, and is being used as a ring gear transgear wherein FIG. 2(A) provides a cross-sectional front view and FIG. 1B provides a side view.

FIG. 3 is a first assembly of spur gears and is being used as a spur gear transgear. The sun gears may be the same in size while all the planetary gears are the same in size, but the planetary gears may be smaller and thicker so as to comprise a basic spur gear transgear, wherein FIG. 3(A) provides a cross-sectional front view and FIG. 3(B) provides a side view.

FIG. 4 is a variation of an assembly of spur gears and the transgear of FIG. 3 having double gears so that the transgear thickness is reduced in cross-sectional front view wherein FIG. 4(A) provides the cross-sectional front view and FIG. 4(B) provides a side view.

FIG. 5 is yet another variation of a spur gear transgear such that by having different size gears, the thickness is reduced in comparison with FIG. 3(A) and wherein FIG. 5(A) provides a cross-sectional front view and FIG. 5B provides a side view.

FIG. 6 is also yet another variation of a spur gear transgear such that by having three planetary gears, the two depicted sun gears can rotate in the same direction when a carrier is held fixed and wherein FIG. 6(A) provides a cross-sectional front view and FIG. 6B provides a side view.

FIGS. 7 through 9 provide building blocks for cam controlled infinitely variable motion control.

FIG. 7 provides an overview of variable pitch cams wherein the relative eccentricity of an eccentric inner earn with respect to an eccentric outer cam provides control via an effective cam profile that grows with degree of eccentricity between the inner and outer cams and wherein FIG. 7(A) depicts an inner cam in front and side view surrounding a shaft; FIG. 7(B) depicts an outer cam for surrounding the inner cam of FIG. 7A and shaft to form an assembly; FIG. 7(C) depicts the inner cam and shaft of FIG. 7(A) located inside the outer cam of FIG. 7(B) to form an assembly also seen in FIG. 7(D) where the effective cam profile is minimized when the outer cam is concentric relative to the center of the cam shaft; and FIG. 7(E) shows the effective cam profile maximized by maximizing the eccentricity of the inner with respect to the outer cam.

FIG. 8 provides an overview of the operation of a one-way clutch or ratchet bearing, sometimes referred to by its trade name Sprag, wherein rotational direction of an outer housing is controlled by needle rollers or balls being free wheeling when a race is rotated in a counter-clockwise direction in FIG. 8(A) and is engaged by the sides of a notch in the housing so as to rotate in the same clockwise direction as the race in FIG. 8(B).

FIG. 9 provides an overview of the operation of a combination of the cam assembly of FIG. 7 with the ratchet or one-way clutch bearing or Sprag of FIG. 8 to form a driver wherein FIG. 9(A) provides a cross-sectional front view and FIG. 9(B) provides a side view of the driver.

FIGS. 10 and 11 are alternative embodiments of a cam controlled IVMC (speed converter) having infinitely variable motion control controlling speed.

FIG. 10 provides an overview of the operation of a cam controlled IVMC (speed converter) utilizing the driver of FIG. 9 to provide infinitely variable speed control for an input shaft such that the output shaft is provided with cam controlled speed wherein FIG. 10(A) provides a cross-sectional front view and FIG. 10(B) provides a side view of the cam controlled IVMC (speed converter) (input at top and driver controlled by cam center and output driven by ratchet or one-way bearing bottom).

FIG. 11 provides an overview of a further cam controlled IVMC (speed converter) to the embodiment of FIG. 10 wherein FIG. 11(A) provides a cross-sectional front view and FIG. 11(B) provides a side view of the cam controlled IVMC (speed converter) (input at top, control comprising a reversing gear and can control at top right and center and output at bottom).

FIG. 12 provides an overview of direction control for a transmission involving non-grinding direction control and constructed with two spur gear transgears wherein one of a bevel gear assembly or a ring gear planetary gear assembly may be used and wherein FIG. 12(A) provides a cross-sectional front view and FIG. 12(B) provides a side view of the transmission and direction control.

FIGS. 13-16 provide applications of cam controlled IVMC as a transmission, pump/compressor and generator.

FIG. 13 provides an overview of a cam controlled infinitely variable transmission, infinitely variable from no output to a maximum output without a clutch and also involving non-grinding direction control wherein FIG. 13(A) provides a cross-sectional front view and FIG. 13(B) provides a side view of the cam controlled infinitely variable transmission with direction control.

FIG. 14 provides an overview of a cam controlled infinitely variable compressor showing a rotary pump or compressor at an output which may be driven by a constant motor input with speed control, the cam controlled infinitely variable motion control controlling the pump/compressor rotational speed in rpm while the motor input is constant wherein FIG. 14 provides a cross-sectional front view.

FIG. 15 provides an overview of a further cam controlled infinitely variable compressor where a driving motor at an input has a speed control for operating a reciprocating pump in cross-sectional front view.

FIG. 16 provides an overview of an embodiment of a cam driven/controlled infinitely variable generator comprising a speed converter whereby a variable speed input is converted to a constant speed, variable torque output for producing, for example, electric power from a variable source such as wind energy or water energy with a speed sensor feedback control to assure constant speed output (for example, sixty Hertz) to a variable transformer in cross-sectional front view.

FIGS. 17 and 18 provide alternative embodiments of pitch controlled IVMC.

FIG. 17 provides an overview of an embodiment of pitch controlled infinitely variable motion control whereby the pitch of a blade at an output controls the amount of output to provide a required output, constant or variable, in cross-sectional front view.

FIG. 18 provides an overview of a similar but reverse embodiment to the pitch controlled infinitely variable motion control of FIG. 17 but wherein the blade is shown at the input and its pitch controls the amount of energy to harness and output to provide a required output, constant or variable, in cross-sectional front view.

FIGS. 19 through 21 provide applications of pitch controlled IVMC in a transmission, compressor/pump and generator.

FIG. 19 provides an overview of a pitch controlled infinitely variable transmission where a pitch controlled infinitely variable motion control introduced in FIG. 17 may be utilized to drive a hydraulic motor with direction control shown in cross-sectional front view.

FIG. 20 provides an overview of a pitch controlled infinitely variable compressor/pump of FIG. 17 used to control the pitch controlled pump or compressor, shown in cross-sectional front view.

FIG. 21 provides an overview of a pitch controlled infinitely variable generator using the input pitch controlled infinitely variable motion control of FIG. 18 for driving a constant speed, variable torque generator at constant speed (such as 60 Hertz) with a speed control feedback loop, shown first in FIG. 16, with a variable transformer in cross-sectional front view.

FIG. 22 provides an overview of an input compensated infinitely variable motion control comprising an input compensating or control motor which may be operating at the same time as an input drive motor (not shown) which may, for example, operate a compressor wherein typically the drive motor speed may be constant while the control motor speed may be variable shown in cross-sectional front view.

FIGS. 23 through 25 provide applications of input compensated IVMC in a transmission, compressor/pump and a generator.

FIG. 23 provides an overview of an input compensated infinitely variable transmission utilizing the input compensated infinitely variable motion control of FIG. 22 showing forward and reverse direction control for, for example, use in a vehicle.

FIG. 24 provides an overview of an input compensated infinitely variable pump or compressor utilizing the input compensated infinitely variable motion control of FIG. 22 for driving a compressor or a rotary pump in cross-sectional front view.

FIG. 25 provides an overview of an input compensated infinitely variable generator using the input compensated infinitely variable motion control of FIG. 22 for driving a constant speed, variable torque (for example, sixty Hertz) output to a variable transformer with speed sensing speed control.

These applications of variations and technologies of infinitely variable motion control (IVMC) with respect to embodiments of generators, transmissions and pumps/compressors will be further described in the detailed description of the drawings which follows.

DETAILED DESCRIPTION

The present invention is directed to applications of infinitely variable motion control (IVMC) in generators, transmissions and pumps/compressors wherein trangears are used for control. A plurality of different examples of transgears will be described with reference to FIGS. 1-6, beginning with a bevel gear assembly, a ring gear assembly and a plurality of embodiments of a spur gear assembly. A variable pitch inner and outer cam assembly, a one-way clutch bearing and a driver are described in FIGS. 7-9, which may be used to provide cam controlled infinitely variable motion control in generators, transmissions and pumps/compressors. FIGS. 10 and 11 describe cam controlled IVMC (speed converters). FIG. 12 describes direction control with two transgears. FIGS. 13-16 depict applications of cam controlled IVMC in a transmission, pumps/compressors and a generator. FIGS. 17 and 18 provide alternative embodiments of pitch controlled infinitely variable motion control. FIGS. 19 through 21 depict applications of pitch controlled IVMC in a transmission, a pump/compressor and a generator. FIG. 22 depicts input compensated infinitely variable motion control. FIGS. 23 through 25 depict applications of input compensated IVMC in a transmission, a pump compressor and a generator. First, transgears will be discussed with reference to FIGS. 1 through 6.

Transgear #1: Bevel Gear Transgear

A bevel gear assembly 100, for example, shown in FIG. 1, is an example of a transgear. Bevel gear transgears are mostly used as differentials, but their applications as controls may be limited.

Referring to front view FIG. 1(A), input gear 102 is attached and may be integral to input shaft 101 also seen in the center of corresponding side view FIG. 1(B)). Gears 103 and 103B are meshed to gear 102 and rotate freely on carrier shaft 106 and 106B, output gear 104 is meshed to gears 103 and 103B and provides an integral output shaft external to and surrounding the input shaft 101. Carrier pin 106, 106B is attached to carrier block portion 105 which surrounds input shaft 101. Bevel gear 103 is assembled around the carrier pin 106 and rotates freely. When an input is connected to rotate input shaft 101 (motor or propeller driven by wind or water) and carrier assembly 105/106/106B is fixed (does not move), input gear 102 and output gear 104 rotate at the same speed/rpm but in opposite directions from one another. When gear 104 is fixed, carrier 106 rotates, for example, at one half the rotational speed of the input shaft 101 and gear 102 and in the same direction. Gears 103 and 103B are idle gears. So, for example, carrier assembly 105/106/106B may be fixed or rotate and may control output based on input. The assembly 100 thus comprises a bevel gear transgear with input, output and control.

The elements of the drawings denoted with "B" at the end of each reference numeral (see, for example, FIG. 1, 3-6, reference numerals 103, 103B, 106, 106B or 303, 303B and so on) refer to an extra set of components, such as carrier portions, gears for other than a functional purpose. For example, gear 103B may, however, provide greater torque capacity and dynamically balance the system.

Transgear #2: Ring Gear Transgear

A ring gear planetary gear assembly 200 shown in FIG. 2 may comprise a further embodiment of a transgear. Ring gear transgears may be used to create different gear ratios depending on which gears or carrier to use as input, output, and control (fix).

Referring to FIG. 2, sun gear 202 is attached to or integral to input shaft 201. Carrier brackets 210 and 211 are attached together by pins 207, 208, and 209. Planetary gears 203, 204, and 205 may rotate freely around the pins and are meshed to sun gear 202 and ring gear 206. When input is connected to input shaft 201 and carrier assembly 210, 211, and pins 207, 208, and 209, are fixed, sun gear 202 becomes the input gear, the carrier assembly 210, 211 becomes the control, and ring gear 206 becomes the output, having a right side sleeve portion surrounding shaft 201 of the ring gear transgear 200. The angular velocity and the direction of rotation can be calculated by the formula below:

$$N_{sun} \cdot \omega_{sun} + N_{ring} \cdot \omega_{ring} = (N_{ring} + N_{sun}) \cdot \omega_{arm}$$

where N is the number of teeth (sun, ring), ω is angular velocity of the element (sun, arm/carrier, or ring) where the formula is found under epicyclic gearing in Wikipedia. Since the angular velocity and rpm are directly proportional, one may use the rpm instead.

Transgear #3: Spur Gear Transgear

A first embodiment of a spur gear transgear 300 is shown in FIG. 3. Recognizing the importance of having mechanical three variable controls, variations of a transgear with spur gears (without ring gears) have been developed and are shown in FIGS. 3-6 in front cross-sectional and side views. Spur gear transgears may basically comprise two sun gears, meshed with each other through planetary gears. Spur gears may be either regular spur gears or helical gears.

Referring to FIG. 3(A), front view, sun gear 302 is attached to or integral with input shaft 301. Carrier brackets 309 and 310 are attached together with pins 306 and 307. Planetary gears 303 and 304 may rotate freely around the pins 306, 307 and mesh with sun gear 302 (input) and sun gear 305 (output). Thus, the output 305 is controlled by the planetary and sun gears forming a basic spur gear transgear assembly 300. Note that part numbers denoted by "B" at the end are not included in the description.

Assume that input is connected to input shaft 301 and rotates clockwise and the carrier 309, 310 and pins 306, 307 are fixed. Left sun gear 302 is the input gear and right sun gear 305 is the output gear connected to an output sleeve. The input sun gear 302 is rotating clock wise with the input shaft 301. Planetary gear 303 then rotates counter clock-wise (CCW), and planetary gear 304 rotates clockwise (CW), and right sun gear 305 of the output rotates CCW. Since the sun gears 302 and 305 are the same size in diameter as seen in FIG. 3(A) and (B), the angular rotation will be same at input and output, but the input and output rotate in opposite directions from one another. This spur gear transgear 300 is thus functionally equivalent to the bevel gear transgear of FIG. 1. These types of transgears with same size planetary gears may be called "basic transgears."

Transgear #4: Further Spur Gear Transgear

The basic transgear shown in FIG. 3 may be designed in the alternative with a three gear width. To reduce the gear width, some of the planetary gears may be replaced by double gears. The reduction of width reduces the length of the pins and the size of the transgear housing.

Referring to FIG. 4, sun gear 402 is attached to or integral with input shaft 401. Carrier brackets 406 and 407 are attached together by pins (the pins are not numbered), and planetary gears 403 and 404 may rotate freely around the pins and meshing sun gears 402 and 405.

If the input is connected to shaft 401 and the input shaft 401 rotates clock wise (CW) and the carrier 406, 407 is fixed, output sun gear 405 becomes the output sleeve. In this case, input sun gear 402 rotates CW, planetary gear 403 rotates CCW, planetary gear 404 rotates CW, and output sun gear 405 rotates CCW. Since input sun gear 402 is larger in diameter than output sun gear 405, the output sun gear 405 may rotate faster than the input shaft 401 and input sun gear 402 and in the opposite direction. This spur gear transgear assembly 400 is not functionally identical to the bevel gear transgear or the basic transgear above, for example, because of the difference in rotational speed output between input and output.

Transgear #5: Spur Gear Transgear

Referring to FIG. 5, there is shown another variation of a spur gear transgear 500 and the double gear is replaced by a single gear with a different width and diameters.

In the spur gear transgear assembly 500 of FIG. 5, sun gear 502 is again attached to or integral with input shaft 501. Carrier brackets 508 and 509 are attached together by pins 506 and 507. Planetary gears 503 and 507 may rotate freely around the pins 506, 507 and meshing input sun gear 502 and output sun gear 505.

If a clockwise (CW) input is connected to input shaft 501 and carrier 508, 509 is fixed, right sun gear 505 becomes the output sleeve. Planetary gear 503 rotates CCW, planetary gear 507 rotates CW, and sun gear 505 rotates CCW. Since input sun gear 502 is larger in diameter than output sun gear 505, the output sleeve of output sun gear 505 will rotate faster than the input and rotate in an opposite direction to the input shaft 501.

This spur gear transgear 500 is also not functionally identical to bevel gear transgears or the basic transgears due, for example, to the input/output speed differences.

Transgear #6: Gear Transgear

A variation of spur gear transgear assembly 600 of FIG. 6 is uniquely different from the previously described transgears. In this case both sun gears 602, 606 are rotating in the same direction when the carrier is held. This feature is advantageous for some applications.

Referring to FIG. 6, sun gear 602 is attached to or integral with input shaft 601. Carrier brackets 607 and 608 are attached together by pins (the pins are not numbered). Planetary gears 603, 604, and 605 may rotate freely around their corresponding pins and meshing sun gears 602 and 606.

If a clockwise (CW) input is connected to input shaft 601 and carrier 607, 608 is fixed, right sun gear 606 becomes the output sleeve. Input sun gear 602 rotates CW with the input 601, planetary gear 603 rotates CCW, planetary gear 604 rotates CW, planetary gear 605 rotates CCW, and right output sun gear 606 rotates CW. The input sun gear 602 is larger in diameter than the output sun gear 606. The output sun gear 606 then rotates faster than the input but in the same direction (not the opposite direction) as the input 601. Unlike other transgears, this spur gear transgear assembly 600 can be used for producing the same direction output without adding an extra gear for reversing the direction.

Cam Controlled Infinitely Variable Motion Control (IVMC)

To convert a constant speed input to an infinitely variable output, an infinitely variable speed converter is needed. A cam controlled Infinitely Variable Motion Control, which is referred to herein as IVMC in short, converts a constant input speed into sinusoidal waveforms using a variable pitch cam (per FIG. 7), rectifies half waves and superimposes all the rectified sinusoidal waveforms into an output. The building blocks necessary for the IVMC system will be now described.

Inner and Outer Cams

As shown in FIG. 7(C) or 7(D), a variable pitch cam assembly 700 comprises an eccentric inner cam 702 surrounding a shaft 701 (FIG. 7(A)) and eccentric outer cam 703 (FIG. 7(B)) assembled around the eccentric inner cam 702. Both inner cam 702 and outer cam 703 form perfectly round circles except that they are each bored eccentrically. Outer cam 703 may freely rotate around inner cam 702 to form minimum eccentric effective cam profile per FIG. 7(D) and maximum eccentric effective cam profile per FIG. 7(E). These cams with an infinitely variable control can produce infinitely variable eccentricity from a minimum effective cam profile where the outer cam 703 is concentric relative to the center of cam shaft 701 per FIG. 7(D) to a maximum effective cam profile per FIG. 7(E) where the outer cam 703 is eccentric relative to the center of cam shaft 701. Since both inner and outer cams are mounted on and around the input cam shaft 701, producing the parts for variable pitch cam 700 is simple, and the design can handle higher torque compared to a crankshaft with an offset shaft.

Sprags

A Sprag, generally known as a ratchet bearing or one-way clutch bearing converts reciprocating motion to one direction, working like a diode in an electronic circuit. Sprag is a trade name for a one-way clutch bearing or a one-way ratchet bearing.

Referring to FIG. 8, a Sprag assembly 800 comprises a race or inner shaft 801 which may rotate in one or the other direction, an outer housing 802 having specially shaped reducing diameter notches or cavities 804 (four being shown). Multiple rollers/balls/wedges 803 are nested in the reducing diameter cavities 804. The input and output can be either connected to race 801 or housing 803. Assume that the input is connected to housing 802 and race 801 is the output. When the input is rotating in a clockwise (engaged) direction (FIG. 8(B), the roller 803 moves to a reduced diameter curved cavity section 805 and wedges housing 802 and race 801 together so as to engage them for mutual clockwise rotation. The input and output are engaged and rotate together. When the input is rotating counter clockwise per FIG. 7(A), the roller moves to free wheeling wider diameter section 805 and the race disengages from the outer housing and is free wheeling. Thus, a one-way or ratchet bearing encourages one-way rotation of an output with respect to an input such that there is an engaged one-way rotation period and a free wheeling period when the input changes rotation direction.

Drivers

A driver 900 may transfer variable pitch cam 700 movement (variable pitch cam 907) of cam shaft 906 to the Sprag (800) embedded output gears 912, 913. Referring to FIG. 9, driver 900 is seen in front view (FIG. 9(A)) and side view (FIG. 9(B)). Driver 901 has a bore 902 (for a variable pitch cam assembly 700 of FIG. 7 identified as element 907) and a slot 903 (for an output gear assembly 800 of FIG. 8). A bearing 908 may be attached to the driver 901 so that the outer cam 907 of the variable pitch cam assembly 700 can rotate in the bearing 908. On an opposite side of the driver 901 at the slot 903, there are rack gears 904 and 905. The rack gear 904 is meshed to output gear 911 (per side view FIG. 9B), and rack gear 905 is meshed to output gear 910. Sprag gears 912 and 913 are embedded to output gears 910 and 911, and mounted on output shaft 909 to promote its one-way rotation. Cam shaft 906 is the input to the driver 900 and output shaft 909 is the one direction output. This driver 901 may be designed to drive two output gears, for example, as seen in FIG. 9 to promote one-way rotation of output shaft 909.

Cam Controlled IVMC (Speed Converter) #1

An assembly 1000 of a variable pitch cam 700, Sprags 800 (not labeled), and drivers 900 controlled by a spur gear transgear, for example, spur gear transgear 300 produces an infinitely variable speed output and so comprises a cam controlled speed converter 1000. The cam controlled speed converter 1000 is a type of Infinitely Variable Motion Control, or IVMC in short, for controlling rotational speed.

Referring to FIG. 10, there is shown a cam controlled speed converter 1000. Drive gear 1002 is attached to or integral with input shaft 1001. Three slotted gears 1003, 1004, and 1005 are meshed to the drive gear 1002 as best seen in front cross-sectional view FIG. 10(A). Inner cam 1007 (viewed inside outer cam 1008 in FIG. 10(B)) is attached to the cam shaft 1006. Outer cam 1008 (shown best in FIG. 10(B) side view) is assembled around the inner cam 1007. Two inner cam/outer cam assemblies may be seen but only one is marked in FIG. 10(A) opposite to the other, both about cam shaft 1006 in a drive circuit portion of FIG. 10(A).

The rotation of outer cam 1008 is restricted by the cam pin 1009 which may slide inside slot 1010 of the slotted gear (FIG. 10(B)). Driver 1012 transfers the cam rotation to a one-way output gear assembly (800) for one-way rotation of output 1021. The race portion 1014 of the one-way output gear assembly is part of output shaft 1021. There are shown two sets of cam assemblies 900 and drivers of the drive circuit portion of FIG. 10(A). The inner cams may be 90 degrees rotationally spaced from each other in one embodiment.

The control gear 1015 of the control circuit is also attached to the input shaft 1001 and meshed to a spur gear transgear assembly 300 through carrier gears 1016 and 1017 (FIG. 10(A)). The left sun gear 1018 of the control circuit is attached to the cam shaft 1006 and the right sun gear 1019 is attached to speed control sleeve 1020 for control of speed.

When the speed control sleeve 1020 is fixed so that outer cams of the control circuit (drive circuit side of FIG. 10(A)) are concentric (minimum eccentricity), there will be no output or the output shaft will not rotate. To change the output speed, the control sleeve 1020 may be turned clockwise or counter clockwise depending upon whether the eccentricity should be increased or decreased to change speed.

In an alternative embodiment, if the control sleeve 1020 should be fixed and should not be interfered by either by input or output, a set of worm and worm gear (not shown) can be added to the control to regulate the control cam eccentricity and so output speed.

Cam Controlled Speed Converter #2

Referring to FIG. 11, there is shown a variation of speed converter 1000 or cam controlled speed converter 1100 which provides room in an outer housing for other functions, such as adding a direction control, without increasing the housing size when compared with the outer housing of speed converter 1000. Two inner cams 1107 and 1108 are attached to cam shaft 1106 as before. Referring to FIG. 11, a reversing gear 1110 is added in between gear 1109, which is attached to cam shaft 1106, and left sun gear 1111 around input shaft 1101. Right sun gear 1114 of a control transgear is attached to input shaft 1101 and carrier 1115 having a control sleeve when turned to adjust cam eccentricity provides the speed control of output shaft 1116.

When the input 1101 is rotating clockwise (CW), the slotted gears 1103, 1104, and 1105 will be rotating CCW. Since the right sun gear 1114 is also attached to the input shaft 1101, it will also rotate CW. When carrier 1115 is fixed, gear 1113 rotates CCW, gear 1112 rotates CW, left sun gear 1111 rotates CCW, reversing gear 1110 rotates CW, and finally gear 1109 rotates CCW. The cams 1107, 1108 on cam shaft 1106 and the slotted gears 1103, 1104, and 1105 will be rotating at the same speed and in the same direction. In this speed converter 1100 when compared with speed converter 1000, there is ample room for a reversing gear 1110 in the external housing.

Direction Control

By assembling two transgears as may be seen in FIG. 12, the direction change from forward to reverse can be made smoothly without grinding gears. In this case, the transgears are used as three variable clutches within direction control 1200.

Referring to FIG. 12, two transgears 500 (FIG. 5) and 600 (FIG. 6) are assembled back to back. The left sun gear 1202 of transgear 500 is attached to the input shaft 1201. Carrier brackets 1208 and 1209 are attached together by pins 1206 and 1207. Planetary gears 1203 and 1204 may rotate freely around their corresponding pins and meshing sun gears 1202 and 1205. A brake band 1210 may be positioned around carrier bracket 1208. Right sun gear 1205 is the output which is attached to output gear 1211.

Similarly, a right sun gear 1212 of control transgear 600 is attached to the input shaft 1201. Left sun gear 1216 is the output which is attached to the same output gear 1211, and a further band brake 1223 may be positioned around carrier bracket 1221.

When the input shaft 1201 is rotating clockwise (CW) and the brake band 1210 is activated or engaged, the carrier brackets 1208 and 1209 will be fixed by the brake, and the right sun gear 1205, output gear 1211 or output will be rotating CCW the opposite direction) from the input. When the brake band 1223 is activated, the carrier 1221/1222 will be fixed and left sun gear 1216, output gear 1211 will be rotating CW, the same direction as the input. Thus, there is direction control via brake bands 1210, 1223. When both bands are free or not activated, there will be no output, neutral, or no forward or reverse direction.

Other variations of brake band controlled transgear direction control may be used for different applications from vehicular to other motor direction control.

Application #1: Cam Controlled Infinitely Variable Transmission or IVT

When a direction control 1200 is added to a cam controlled speed converter 1000 or 1100, it becomes an infinitely variable transmission or cam controlled IVT 1300 (FIG. 13). Referring to FIG. 13, a direction control assembly (a spur gear transgear 1200) may be added to cam controlled speed converter assembly 1100 to make a cam controlled IVT 1300. Output gear 1303 of the direction control assembly 1200 is meshed to output gear 1304 of the output shaft 1308. On the direction control shaft 1307 for forward/reverse direction control, two direction control cams 1309 and 1310 (FIG. 13(B)) are attached to activate the brake bands 1305 or 1306. The brake brand tension is controlled by adjusters 1311 and 1312 which may be adjusted by a user. Since the direction is controlled by squeezing the band instead of engaging or disengaging gear teeth, a shifting of direction from forward to reverse can be made quicker and without grinding teeth.

Application #2: Cam Controlled Pump/Compressor

When a rotary pump or compressor is attached to a cam controlled speed converter, for example, converter 1000 (or 1100), it becomes an infinitely variable rotary pump or compressor 1400 as seen in FIG. 14. Shown in FIG. 14 is a speed converter assembly 1000 with its output 1403 connected to a rotary pump. This is one exemplary application of a cam controlled speed converter 1000 to form a cam controlled pump/compressor 1400.

Application #3: Cam Controlled Pump/Compressor

To achieve a smaller pump or compressor than that depicted in FIG. 14, the drivers and output gears can be replaced by pistons to make a reciprocating pump or compressor 1500 as shown in FIG. 15. (The external rotary pump of cam controlled compressor 1400 is eliminated). The input shaft 1501 and control 1502 are connected to an internal reciprocating pump 1503. This concept does not require one-way clutch bearings, ratchets or Sprags or other one-way rotational means known in the art and may save cam controlled compressor unit costs to manufacture and operate.

Application #4: Cam Controlled Generator

Cam controlled speed converters are scalable, and the output can be infinitely variable. These speed converters can be used to harness renewable energy by converting variable input front, for example, wind energy or water flow energy or ocean waves to a constant clean electrical energy output, for example, at sixty hertz. To harness more energy, a constant speed generator can be modified as a constant speed and variable torque generator. Such clean energy variable speed input to constant speed output generators are described in U.S. patent application Ser. No. 13/384,621 filed Jan. 18, 2012, and incorporated by reference as to its entire contents. FIG. 8 of this patent application, which has published as WO 20111011358 on 27 Jan. 2011, and its associated description may be referred to for further details of achieving variable torque. In brief, a stator 1608 may be moved from a low torque position shown to be positioned over rotor 1607 for maximum torque.

Referring to FIG. 16, a cam controlled generator 1600 may comprise a cam controlled speed converter 1000. A set of worm 1603 and worm gear 1604 may be attached to right sun gear 1602 of a speed control transgear. A feedback control circuit 1609 sensing output speed of shaft 1605 provides a control input to the speed control transgear. A variable torque generator 1606 is connected to the output shaft 1605 and the constant speed is determined by the feedback control 1609. The rotor 1607 of the variable torque generator 1606 is attached to the output shaft 1605. Stator 1608 of generator 1606 is free to move within the generator housing from a position of low torque (shown) to high torque proximate to rotor 1607. The variable torque generator 1606 output is constantly monitored to make proper speed adjustment by output control 1609 via worm assembly 1603, 1604 and torque adjustment by varying the position of the stator 1608 with the rotor. A variable transformer 1610 is attached to the generator 1606 to produce constant voltage output 1611 at constant frequency when the rotational speed input 1601 may vary, for example, with varying wind velocity or other varying renewable energy source for turning shaft 1601.

The constant output produced by the cam controlled generator 1600 produces constant frequency and a power converter known in the prior art and expensive to maintain is not needed. The variable torque generator is designed to adjust the overlap of the rotor 1607 and stator 1608 so that the cut-in speed can be further reduced and the generator rating can be increased to harness more renewable energy. Variable transformer 1610 converts variable voltage produced by the variable torque generator to a constant voltage and the speed is controlled by the feedback control 1609, for example, to sixty Hertz. The adjustments made by the stator 1608 can be made by rotor 1607.

Pitch Controlled IVMC

For some applications, the speed variation can be made by controlling the pitch of rotor blades similar in form to wind generator and other variable pitch propellers, for example, useful in clean wind/water electric power generation. Pitch controlled IVMC will be now discussed with reference to FIGS. 17 through 21.

Pitch Controlled Output

Some systems are powered by engines or motors, and transmissions are used to convert the given input to a needed variable output. Torque converters of automatic transmissions and variable pitch pumps are typical hydraulic applications belonging to this category of application. Pitch controlled IVMC will now be discussed with reference to FIG. 17 and FIG. 18 and its applications discussed with reference to FIGS. 19 through 21.

Referring to FIG. 17, a transgear is used for controlling the pitch of a blade 1713, 1713B. (The control on the right may appear to be a transgear but actually it is a direction reverser or control 1707, 1708, 1709.) Left sun gear 1702 is attached to or integral with input shaft 1701. A worm gear 1716 is attached to a carrier. Planetary gears 1703 and 1704 are associated with pins (not labeled but refer to spur gear transgear 300 of FIG. 3). Right sun gear 1705 is attached to gear 1706 and surrounds shaft 1701. The direction of gear 1706 will be reversed to gear 1709 by gears 1707 and 1708. Bevel gear 1710 is attached to gear 1709. Bevel gear 1714 is attached to and integral with input shaft 1701. Adjustment of worm 1717 controls the pitch of blade 1713 which is attached to gear 1711 and shaft 1712 for rotation. Here, the output, for example, of a rotary pump or compressor is controlled by the blade pitch controlled by worm 1717. The arrows 1715 may indicate direction of fluid flow with the speed of flow set by the blade pitch.

Pitch Controlled Input

Some applications are required to harness the input power received by the blades. Wind generators, for example, are harnessing wind energy by controlling the pitch to maximize the power coefficient.

Referring to FIG. 18, a pitch controlled infinitely variable motion control 1800 is shown. The rotor blade assembly (left) is selectively harnessing the input energy by controlling the pitch of the blades via pitch control where the renewable energy direction is indicated by the depicted arrows. This embodiment 1800 is opposite to the system 1700 described in the previous section. Here, the input to be harnessed is controlled by the blade pitch. For example, if the blade pitch is set to catch the renewable energy, then, the output shaft will rotate at high rotational velocity but if the blade pitch is set to allow free flow of the renewable energy, then, the output shaft rotational velocity will be at a minimum.

Application #1: Pitch Controlled Transmission

Engine controlled torque converters, for example, can be replaced by pitch controlled torque converters as shown, for example, in FIG. 19 to form a pitch controlled infinitely variable transmission (IVT) 1900. The pitch of a hydraulic pump or compressor can be varied by a transgear. An input shaft 1901 is attached to or integral with a sun gear 1902. A worm 1920 provides pitch control of blade assembly 1913 of output 1921. Worm gear 1919 is attached to carrier. Reference may be made to the spur gear transgear of FIG. 3 for planetary gears 1903, 1904 and pins 1917 and 1918. Hydraulic output 1921 may be filled with fluid circulated by pitch controlled blade assembly 1911. The pump output 1921 drives hydraulic motor with direction control. The worm 1920 facilitates pitch control in a similar manner as FIG. 17. The pitch controlled IVMC of FIG. 17 is coupled to a hydraulic motor 1922 with direction control 1923 to provide reversible output 1924 from hydraulic output 1922.

Referring to FIG. 19, a pitch controlled infinitely variable transmission 1900 may, for example, be used for controlling the flow of hydraulic transmission fluid.

Application #2: Pitch Controlled Pump/Compressor

FIG. 20 is a pitch controlled pump/compressor 2000 similar in embodiment to the embodiment of FIG. 19 without a hydraulic motor and direction control. As shown in FIG. 20, a constant speed motor input 2001 can produce variable flow output by controlling the pitch of the blade in a pitch controlled compressor 2000 operated similarly as pitch controlled IVMC 1700 (FIG. 17). The pitch controlled pump/compressor 2000 comprises the basic building block of pitch controlled IVMC 1700 of FIG. 17 where the input is denoted 2001 and the compressor output 2014. Similar reference numerals denote similar elements, for example, gear 1711 is equivalent to gear 1911 and gear 2011 where the first two digits represent the Figure number.

Application #3: Pitch Controlled Generator for Harnessing Renewable Energy

FIG. 21 provides an overview of a pitch controlled generator 2100 using the input pitch controlled infinitely variable motion control 1800 of FIG. 18 for driving a constant speed, variable torque generator 2118 at constant speed (such as 60 Hertz) with a speed control feedback loop 2117, shown first in FIG. 16, with a variable transformer 2121 in cross-sectional front view. The constant speed, variable torque generator 2118 is shown in a low torque configuration with rotor 2119 positioned away from moveable stator 2120. Referring to FIG. 21, there is shown a pitch controlled generator 2100 for harnessing renewable energy such as wind or water energy. A blade assembly 2101 may be configured to receive a source of renewable energy such as wind and comprise blades adjustable as to pitch for harnessing renewable wind velocity so that the blade pitch may change, for example, during high wind speeds versus low wind velocity achieve a constant velocity output of shaft 2104. This is a variation of harnessing renewable energy by converting variable wind energy to grid compatible constant power at output 2122. As shown in FIG. 21, this is a very simple system and can be beneficial for rather constant flow renewable energy such as provided by steady flow rivers. The blade assembly 2101 rotates with the renewable energy flow rotating shaft 2104 via gear 2103. A worm gear assembly assures constant output with variable input via feedback control 2117. Electrical energy at constant output and frequency 2122 is fed to a power grid via variable transformer 2121.

Input Compensated IVMC

FIG. 22 provides an overview of an input compensated infinitely variable motion control comprising an input compensating or control motor which may be operating at the same time as an input drive motor (not shown which may, for example, operate a compressor wherein typically the drive motor speed may be constant while the control motor speed may be variable, the IVMC shown in cross-sectional front view. This concept may produce a variable output by a compensating portion of the given input. In such a system the input torque may be adequately bigger than the compensating variable speed control input by worm gear 2209.

Referring to FIG. 22, the input sleeve 2201 is attached to left sun gear 2202 and may surround an output shaft 2210 attached to output gear 2205. The right sun gear 2205 attached to output shaft 2210 is meshed to the left sun gear 2202 of the input sleeve 2201 by planetary gears 2203 and 2204. The carrier brackets 2206 and 2207 are attached to worm gear 2208 and worm 2209 forming a worm gear assembly that may be adjusted by an input compensating motor.

Operationally, the input torque is bigger than the compensating force. The compensating motor 2209 may be a variable speed or infinitely variable speed motor and so relieve the input instead of driving against the input.

Application #1: Input Compensated IVMC for a Transmission

FIG. 23 provides an overview of an input compensated infinitely variable transmission 2300 utilizing the input compensated infinitely variable motion control of FIG. 22 showing forward and reverse direction control 1200 for, for example, use in a vehicle. For some specific applications, when the output torque is not an issue, the input compensating IVT 2300 can provide some speed variation and direction change useful in a transmission. As shown in FIG. 23, input compensated IVT 2300 is compact and less costly than a hydraulic transmission and provides drive and reverse outputs. Direction control 1200 is used to reverse directions. Similar reference numerals are used again to refer to similar elements, for example, planetary gear 2303 is equivalent to planetary gear 2203.

Application #2: Input Compensated IVMC for Pump/Compressors

FIG. 24 provides an overview of an input compensated infinitely variable motion control for a pump or compressor utilizing the input compensated infinitely variable motion control of FIG. 22 for driving a compressor or a rotary pump 2410 in cross-sectional front view. When the input 2401 torque on sleeve 2401 is fairly big and the output load does not vary much, this input compensated system 2400 can be applied to advantage. As shown in FIG. 24, a rotary pump 2410 is added to an input compensating IVMC 2200 (FIG. 22). Compensating motor 2409 compensates for input 2401 as described above. In this drawing, the elements are numbered similarly as above where the first two digits indicate the drawing number and the last two are the element, e.g. right sun gear 2405, planetary gears 2403, 2404 and so on.

Application #3: Input Compensated IVMC for Harnessing Renewable Energy

FIG. 25 provides an overview of an input compensated generator 2500 using the input compensated infinitely variable motion control 2200 of FIG. 22 for driving a constant speed, variable torque generator 2512 (for example, sixty Hertz) output to a variable transformer 2515 with speed sensing speed control circuit (not numbered) operating worm assembly 2508, 2509. A speed converter comprises output shaft 2501 to which is attached left sun gear 2502. Elements 2503 and 2504 are the planetary gears for input compensation. Element 2502 is an input gear and 2505 is a right sun gear. This generator 2500 is another variation for harnessing renewable energy. For steady flowing streams, without much flow rate variation, a constant speed output can be easily produced by compensating the input. As shown in FIG. 25, a constant speed, variable torque generator 2512, comprising rotor 2513 and moveable stator 2514, is connected to a variable transformer 2515. These are added to an input compensating IVMC with a speed converter to output electric power via output 2516 to a grid.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What I claim is:

1. Infinitely variable motion control apparatus including a transgear assembly, the transgear assembly comprising an input, an output and a control, the input comprising an input shaft for receiving a mechanical rotational input for causing the input shaft of the transgear assembly to rotate at variable rotational velocity, the input further comprising an input gear one of attached to or integral with the input shaft, the input gear comprising a first sun gear;

the output comprising an output gear for driving an output having a direction of rotational velocity opposite in direction to the rotational velocity of the input shaft, the output gear comprising a second sun gear, the second sun gear being one of attached to or integral with an output sleeve, the second sun gear and output sleeve surrounding the input shaft and having an output rotational velocity, and the control comprising a carrier assembly, the carrier assembly coupled between the input gear and the output near surrounding the input shaft, the carrier assembly comprising first and second carrier brackets attached together with first and second carrier pins and first and second planetary gears rotating freely around the first and second carrier pins and the first and second planetary gears being meshed with the input and output sun gears, the control for controlling the output rotational velocity based on the input variable rotational velocity.

2. The infinitely variable motion control apparatus of claim 1, the first and second planetary gears having equal diameter.

3. The infinitely variable motion control apparatus of claim 1, the carrier assembly further comprising third and fourth carrier pins having third and fourth planetary gears freely rotating respectively around the third and fourth carrier pins, the third and fourth planetary gears being meshed with the input sun gear and the output sun gear.

4. The infinitely variable motion control apparatus of claim 3, the first, second, third and fourth planetary gears having equal diameter.

5. The infinitely variable motion control apparatus of claim 1, one of the planetary gears being further distant from the input shaft than the other planetary gear, the more distant planetary gear comprising a double gear.

6. The infinitely variable motion control apparatus of claim 3, two of the planetary gears being further distant from the input shaft than the other two planetary gears, the more distant planetary gears comprising double gears.

7. The infinitely variable motion control apparatus of claim 1, the input sun gear having the same diameter as the output sun gear.

8. The infinitely variable motion control apparatus of claim 1, the input sun gear having a larger diameter than the output sun gear.

9. The infinitely variable motion control apparatus of claim 1, the first planetary gear having a diameter equal to the respective diameter of the second planetary gear.

10. The infinitely variable motion control apparatus of claim 1, the first planetary gear having a larger diameter and a smaller width than the respective diameter and width of the second planetary gear.

11. The infinitely variable motion control apparatus of claim 10, the input sun gear having a larger diameter than that of the output sun gear.

12. The infinitely variable motion control apparatus of claim 1, the carrier assembly further comprising a third carrier pin and a fourth carrier pin, a third planetary gear for rotating around the third carrier pin and a fourth planetary gear for rotating about the fourth carrier pin and the third and fourth planetary gears being meshed with one of the input sun gear and output sun gear.

13. The infinitely variable motion control apparatus of claim 1, the output comprising the output sun gear further comprising an output sleeve surrounding the input shaft.

14. The infinitely variable motion control apparatus of claim 12, the input sun gear having a larger diameter than that of the output sun gear.

15. The infinitely variable motion control apparatus of claim 12, the carrier assembly further comprising fifth and sixth carrier pins, fifth and sixth planetary gears freely, respectively rotating around the firth and sixth carrier pins and being meshed with one of the input sun gear and output sun gear, and another planetary gear.

16. The infinitely variable motion control apparatus of claim 15, the input sun gear having a larger diameter than that of the output sun gear.

17. The infinitely variable motion control apparatus of claim 4 having a three gear width.

18. The infinitely variable motion control apparatus of claim 5 having first and second pairs of planetary gears surrounding the input shaft.

19. The infinitely variable motion control apparatus of claim 12 having a three gear width.

20. Infinitely variable motion control apparatus including a transgear assembly, the transgear assembly comprising an input, an output, and a control, the input comprising an input shaft for receiving a mechanical rotational input for causing the output shaft of the transgear assembly to rotate at variable rotational velocity, the input further comprising an input sun gear one of attached to or integral with the input shaft, the output comprising an output gear for driving an output having a direction of rotational velocity opposite in direction to the rotational velocity of the input shaft, the output gear surrounding the input shaft, the output gear comprising a ring gear having a sleeve portion surrounding the input shaft, the ring gear being meshed to first, second and third planetary gears, the first, second and third planetary gears being meshed to the input sun gear, the control comprising a carrier assembly, the carrier assembly comprising first and second carrier brackets, first, second and third carrier pins, first, second and third planetary gears, the first, second and third planetary gears rotating freely about the first, second and third carrier pins of the carrier assembly, the carrier assembly coupled between the input gear and the output gear surrounding the input shaft, the control for controlling the output rotational velocity based on the input variable rotational velocity.

21. The infinitely variable motion control apparatus of claim 20, the ring gear having an outer diameter equal to the outer diameter of the first carrier bracket.

* * * * *